United States Patent [19]

Cowpland et al.

[11] 3,731,004

[45] May 1, 1973

[54] IMPEDANCE MATCHING CIRCUIT FOR TONE RINGING

[75] Inventors: Michael C. J. Cowpland; Donald A. Draper, both of Ottawa, Ontario, Canada

[73] Assignee: Microsystems International Limited, Montreal, Quebec, Canada

[22] Filed: June 1, 1971

[21] Appl. No.: 148,530

[30] Foreign Application Priority Data

May 28, 1971 Canada ............................114,223

[52] U.S. Cl. ..............................................179/84 T

[51] Int. Cl. ..............................................H04m 1/76

[58] Field of Search ..........................179/84 R, 84 T; 307/12; 321/10, 27 R

[56] References Cited

UNITED STATES PATENTS

| | | | |
|---|---|---|---|
| 3,576,443 | 4/1971 | Brown | 307/12 |
| 3,408,551 | 10/1968 | Kuba | 321/10 |

*Primary Examiner*—Thomas W. Brown
*Assistant Examiner*—David L. Stewart
*Attorney*—L. Brooke Keneford

[57] ABSTRACT

The invention relates to an impedance matching circuit designed to minimize current drain on the supply thereto while maintaining maximum current driving efficiency through a load and particularly adapted to drive an inductive load. The invention has particular applicability to the field of telephony, in that the circuit may be used to drive a tone ringer for a telephone set.

3 Claims, 10 Drawing Figures

INVENTORS
MICHAEL C. J. COWPLAND
DONALD A. DRAPER
BY L. Brooke Vansford
PATENT AGENT INVENTORS
MICHAEL C. J. COWPLAND
DONALD A. DRAPER
BY L. Brooke Kerford
PATENT AGENT INVENTORS
MICHAEL C. J. COWPLAND
DONALD A. DRAPER
BY [signature]
PATENT AGENT

IMPEDANCE MATCHING CIRCUIT FOR TONE RINGING

The present invention relates to an impedance matching circuit designed to minimize current drain on the supply thereto whilst maintaining maximum current driving efficiency through a load and particularly adapted to drive an inductive load.

The invention has particular application in the field of telephony and specifically in driving a tone ringer for a telephone set. Whilst the general usefulness of the impedance matching circuit described and claimed herein will be readily apparent, it is with reference to its particular applicability to the telephone art that the invention will be described.

The ringer of a telephone is conventionally an electro-mechanical bell or vibrator of relatively low efficiency and low impedance. The ringing signal which operates a telephone bell is normally an 88 volt R.M.S., 20 cycle sine wave, this high power signal being required partly due to the low efficiency of the bell and partly to enable the threshold of operation of the bell to be high enough that it will not be triggered by spurious signals on the line. Such spurious signals may include voice, rotary-dial pulsing, and noise signals. The most serious of these spurious signals is rotary dial pulsing, which on short loops can generate large voltage spikes. In the case of the conventional bell, this is taken care of by the fact that the vibrating clapper has to reach a certain amplitude before it strikes the bell. However, in an electronic tone ringer, this operating threshold has to be provided electrically in order that the ringer will not be energized by unwanted signals. This may be accomplished by means of a voltage threshold circuit with smoothing to remove the inductive spikes from the dial pulses. Clearly, the threshold must be chosen to be large enough that the ringer will not be triggered by spurious pulses but low enough to be operated by the ringing voltage under worst case conditions (for example, over large loops or reduced power). This is clearly a problem in that if several ringers are provided in parallel the voltage drop across the maximum feed resistance caused by the current draw of the ringers lowers the voltage at the end of the loop. If this voltage drops to below the operating threshold for the ringer or ringers at the end of the loop, then the ringers will perform erratically or not at all. Thus, it is highly desirable that the ringer circuit should draw minimal current.

An obvious solution to this problem would be to provide a high impedance transducer, for example a ceramic or electret transducer, but these have not yet reached the stage of development, availability and economy that magnetic transducers have. By utilizing the circuit of the present invention, it is possible to use a low impedance magnetic transducer without encountering the problems set forth above.

Therefore, the objects of the present invention are realized by provision of an impedance matching circuit comprising a bridge network across which inductive load means to be driven are connected, said network comprising switching means adapted to energize said load from a voltage supply with minimal current draw from said supply. Specifically, the invention comprises first and second input terminals adapted for connection across an alternating current supply, first and third switching means connected to said first terminal, second and fourth switching means connected to said second terminal, said first and second switching means being series interconnected and said third and fourth switching means being series interconnected, inductive load means connected between the interconnections of said first and second and said third and fourth switching means respectively, first unidirectional current passing means connected across said second switching means, second unidirectional current passing means connected across said fourth switching means, the direction of current flow through each of said unidirectional current passing means being from said third terminal to said first and second switching means respectively, means for connecting said second and fourth switching means to means adapted to alternately turn on said second and fourth switching means through 50 percent duty cycles by application to the control elements thereof of a switching signal, and means for connecting said first and third switching means to means adapted to turn on said first and third switching means by application to the control elements thereof of switching pulses.

The invention will now be described further by way of example only and with reference to the accompanying drawings in which.

Figure 1A:
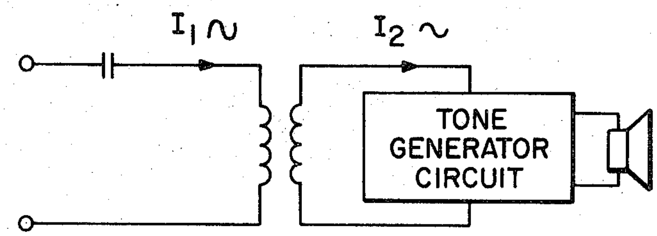
Fig. 1A (PRIOR ART)
FIGS. 1A–1C show various impedance transformation circuits according to the prior art.
Figure 1B:
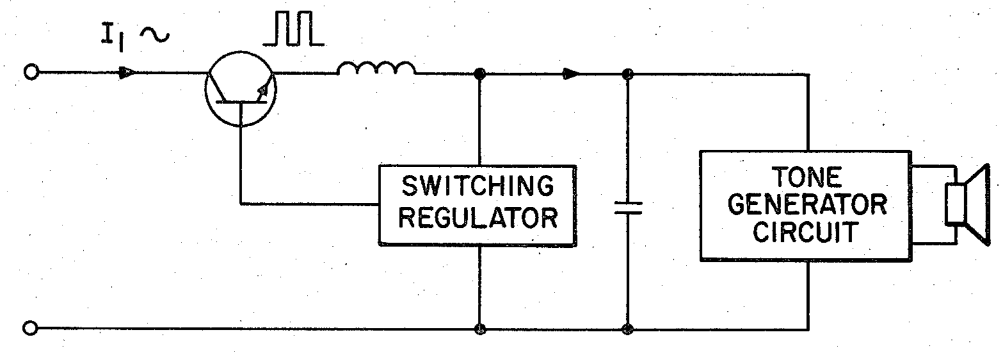
Fig. 1B (PRIOR ART)
Figure 1C:
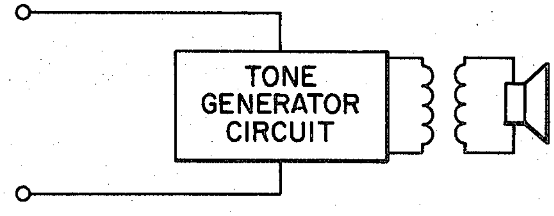
Fig. 1C (PRIOR ART)

Referring now to the drawings, FIG. 1 shows various prior art forms of impedance matching arrangements. In FIG. 1A, an input transformer is employed in order to transform the relatively high voltage at the input to a lower voltage higher current signal. However, as mentioned above, the input signal is normally of 20 cycles frequency and the transformer is therefore necessarily bulky. FIG. 1B shows a D.C. to D.C. converter utilizing a small, high-Q inductor in a self oscillatory circuit at high frequency. This circuit is analogous to that shown in FIG. 1A except that it avoids the necessity for a bulky and expensive transformer by using a small inductor operating at about 30 kilocycles. However, this advantage is only realized at the expense of a considerably larger amount of circuitry and is therefore sill relatively expensive. In FIG. 1C, an output transformer is used between the tone generator circuit and the transducer, which raises the impedance of the transducer so that it draws reduced current at higher voltage. This circuit has the drawback that a relatively expensive transformer is required.

Figure 2:
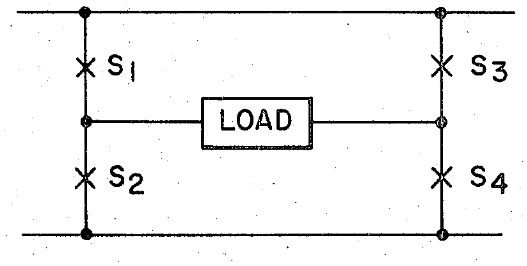
FIG. 2 shows schematically a basic full bridge switching arrangement for driving current through a load.

The most efficient way of driving power into a load from a single power supply is a full bridge switching arrangement as shown in FIG. 2. The load is alternately connected first one way then the other way across the power supply by alternately closing switch pairs $S_1$ $S_4$ and $S_2$ $S_3$. Assuming the switches are ideal, the circuit is 100 percent efficient and all power is dissipated in the load. Transistors are good switches at audio frequencies — especially if the input voltage is of the order of 30 volts which is suitable for a tone ringer. The normal arrangement is to connect switch pairs $S_1$ $S_4$ half the time and $S_2$ $S_3$ the other half, providing a symmetrical square wave of voltage across the load. However, with realistic load impedances this arrangement draws undesirably high current from the power supply. Various methods of impedance matching employing this general concept have been described in the prior art — examples of such teachings are U.S. Pat. Nos. 3,373,338 (Corey et al.) dated Mar. 12, 1968; 2,574,068 (Shumard) dated Nov. 6, 1951; 3,408,551 (Kuba) dated Oct. 29, 1968; 3,328,596 (Germann et al.) dated June 27, 1967 and 1,946,292 (Mittag) dated Feb. 6, 1934. The method of the present invention employs circuitry which employs the basic concept shown in FIG. 2, but is simpler and more efficient than the arrangements taught in the above mentioned patents, particularly with regard to its capability of drawing minimal current from the supply.

Figure 3A:
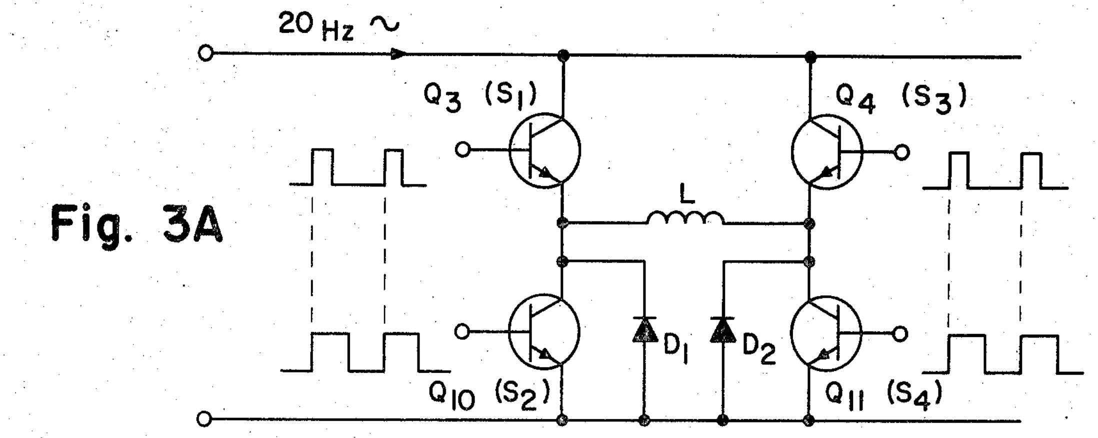
FIGS. 3A–3C show an impedance matching circuit according to the present invention.
Figure 3B:
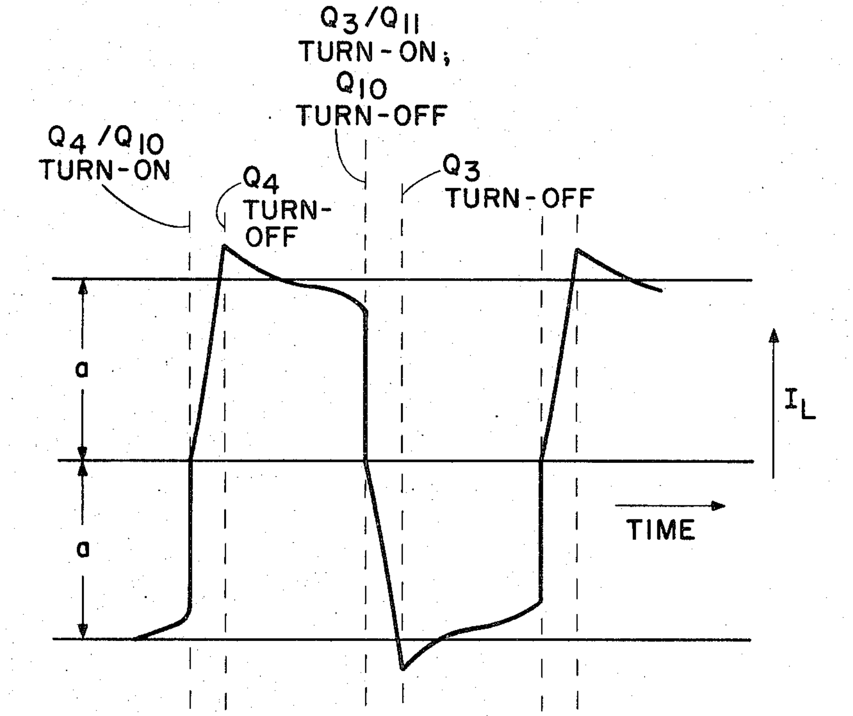
Figure 3C:
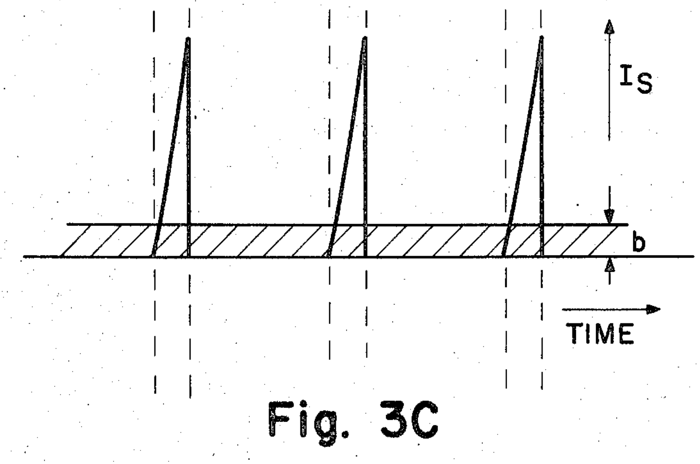

Referring now to FIGS. 3 to 6 inclusive, FIG. 3 shows an impedance matching network fed from a 20 cycles power supply denoted by terminals A and B. The network comprises transistors $Q_3$, $Q_4$, $Q_{10}$, and $Q_{11}$, which transistors function as the switches $S_1$ to $S_4$ inclusive of FIG. 2. Thus, the collectors of transistors $Q_3$ and $Q_4$ are connected to the terminal A and the emitters of transistors $Q_{10}$ and $Q_{11}$ are connected to terminal B, the emitters of $Q_3$ and $Q_4$ being connected to the collectors of $Q_{10}$ and $Q_{11}$ respectively. The inductive load L (normally an electro magnetic transducer) is connected as the load in FIG. 2. Across transistor $Q_{10}$ and $Q_{11}$ are connected diodes $D_1$ and $D_2$ respectively, the anodes of said diodes being connected to the terminal B. Transistors $Q_{10}$ and $Q_{11}$ are pulsed with a square wave signal which alternately switches $Q_{10}$ and $Q_{11}$ in a 50 percent duty cycle. Derived from the leading edges of the square wave signal is a pulse train applied to transistors $Q_3$ and $Q_4$, the pulses being operative to trigger $Q_3$ into conduction at the same time as $Q_{11}$ but for a substantially shorter period of time, and, similarly, to trigger $Q_4$ into conduction at the same time as $Q_{10}$ but for a substantially shorter period of time. Consider the situation when $Q_4$ and $Q_{10}$ are triggered into conduction. $Q_3$ and $Q_{11}$ are non-conducting. Whilst $Q_4$ and $Q_{10}$ are both conducting, current in the inductive load L builds up rapidly at a rate V/L (V being the supply voltage and L being the inductance of the load). When $Q_4$ turns off, $Q_{10}$ remains in conduction and the current tends to continue due to the inductance L and finds a path through diode $D_1$. Current is only drawn from the power supply whilst $Q_4$ is on, the rest of the current through the remainder of the turn-on cycle of $Q_{10}$ being supplied by diode $D_2$. Precisely the same conditions apply to $Q_3$ and $Q_{11}$ and diode $D_1$. Referring now to FIGS. 3B and 3C, FIG. 3B is a plot of current flow through the load L with respect to time. When $Q_4$ and $Q_{10}$ turn on, the current builds up rapidly in the load until $Q_4$ is turned off. From this point, current will continue to flow through $Q_{10}$ and diode $D_2$ until $Q_{10}$ is turned off, giving the wave form shown in FIG. 3b. As $Q_{10}$ is turned off, $Q_3$ and $Q_{11}$ are simultaneously turned on and the second half of the cycle completed through the load. Thus, an alternating current flow of generally square wave form occurs through the load of a mean amplitude at approximately the value *a* as shown on the plot in FIG. 3B. Turning now to FIG. 3C, current is only drawn from the supply when $Q_4$ and $Q_{10}$ are both turned on, and the supply current being unidirectional therefore presents a series of spikes on a plot of current drain versus time. The spikes are of time duration and amplitude equivalent to the current build up between the corresponding points of time in FIG. 3B. If this intermittent current draw is smoothed, the average current drawn will be of approximately the amplitude *b* as shown in FIG. 3C, which is clearly considerably less than *a* in FIG. 3B. Thus, transforming action has occurred, and for a substantial current flow through the load L, a relatively small current has been drawn from the current supply.

Figure 4:
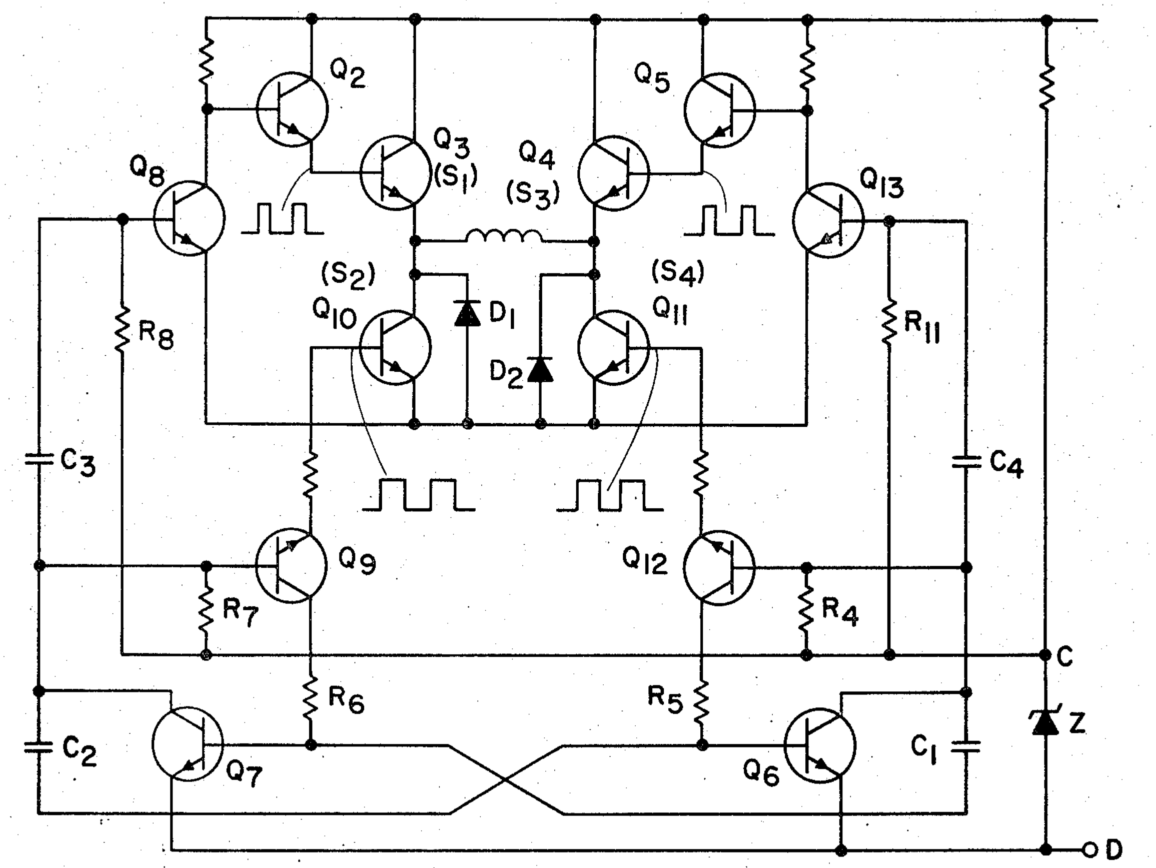
FIG. 4 shows a complete operating circuit, including the impedance matching circuit of FIG. 3, and FIG. 5 and 6 show various circuit blocks of the schematic shown in FIG. 4.
Figure 5:
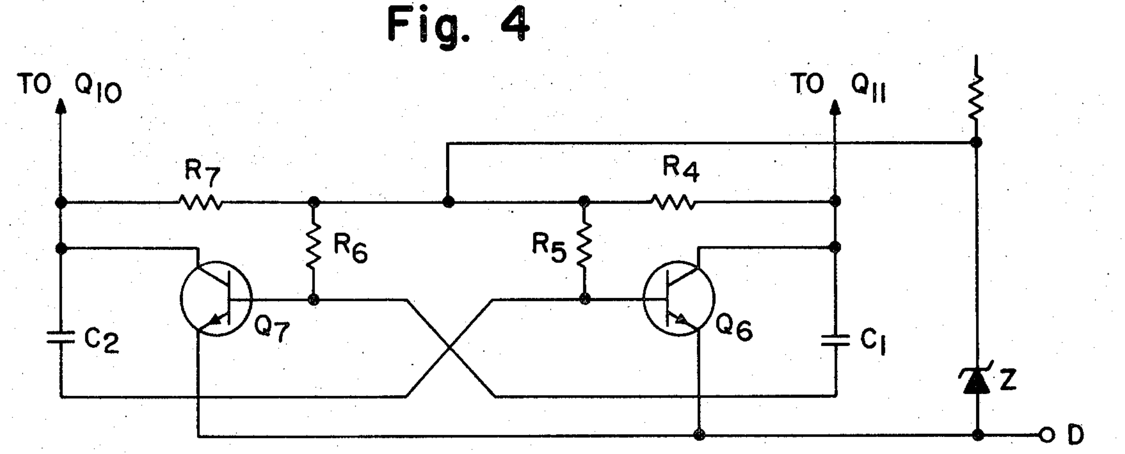
Figure 6:
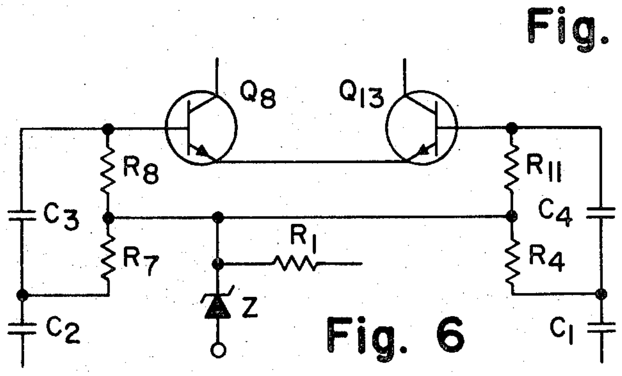

Turning now to FIGS. 4, 5 and 6, FIG. 4 shows a composite network including switching means for the transistors $Q_3$, $Q_4$, $Q_{10}$ and $Q_{11}$ of FIG. 3A. FIG. 5 shows a portion of the circuitry of FIG. 4, and specifically a free-running multivibrator comprising resistors $R_4$ to $R_7$ inclusive, capacitors $C_1$ and $C_2$, transistors $Q_6$ and $Q_7$, and zener diode Z connected across supply terminals C and D (see also FIG. 4). The output from the multivibrator circuit is applied to the gates of transistors $Q_{10}$ and $Q_{11}$ through impedance matching transistors $Q_9$ and $Q_{12}$ (see FIG. 4). As explained above, the signal applied at the gates of each of $Q_{10}$ and $Q_{11}$ is a square wave signal which alternately triggers $Q_{10}$ and $Q_{11}$ into conduction in a 50 percent duty-cycle. The output from the multivibrator circuit of FIG. 5 is also adapted to alternately energize the timing circuits constituted by resistors $R_7$, $R_8$ and capacitor $C_3$ and resistors $R_4$, $R_{11}$ and capacitor $C_4$ respectively. These circuits alternately apply pulses in sychronization with the leading edges of square wave signal generated by the multivibrator or circuit to the bases of transistors $Q_3$ and $Q_4$ through impedance matching transistors $Q_2$ and $Q_8$ and $Q_5$ and $Q_{13}$ respectively.

The timing circuitry described above is well suited to hybrid fabrication in that components such as capacitors $C_1$ to $C_4$ inclusive can be employed as discrete components. However, the present state of monolithic development does not readily adapt to the use of capacitors having these values and where a monolithic device is required, a high frequency clock generater and digital counting and decoding gating techniques may well be substituted for the timing circuitry described above in order to derive the time periods necessary for operation of the impedance matching circuit. It will be appreciated that techniques such as these will be readily apparent and devised to those skilled in the art of logic design.

As stated above, the invention has general applicability to those situations where relatively high power signals are required to drive an inductive load but minimum current drain on the supply is also required.

What is claimed is:

1. An impedance matching circuit comprising first and second input terminals adapted for connection across an alternating current supply, first and third switching means connected to said first terminal, second and fourth switching means connected to said second terminal, said first and second switching means being series interconnected and said third and fourth switching means being series interconnected, inductive load means connected between the interconnections of said first and second and said third and fourth switching means respectively, first unidirectional current passing means connected across said second switching means, second unidirectional current passing means connected across said fourth switching means, the direction of current flow through each of said unidirectional current passing means being from said second terminal to said first and third switching means respectively, means for connecting said second and fourth switching means to means adapted to alternately close each of said second and fourth switching means in a 50 percent duty cycle by application to the control elements thereof of a first switching signal, and means for connecting said first and third switching means to means adapted to close said first and third switching means simultaneously with but for shorter duration than said fourth and second switching means respectively by application to the control elements thereof of pulses.

2. An impedance matching circuit comprising first and second input terminals adapted for connection across an alternating current supply, first and third transistors having their collectors connected to said first terminal, second and fourth transistors having their emitters connected to said second terminal, the emitter of said first transistor being connected to the collector of said second transistor and the emitter of said third transistor being connected to the collector of said fourth transistor, inductive load means connected between the emitters of said first and third transistors, first diode means connected across the emitter and collector of said second transistor, second diode means connected across the emitter and collector of said fourth transistor, the anode of each of said first and second diode means being connected to the emitter of each of said second and fourth transistors, means for connecting said second and fourth transistors to means adapted to alternately trigger each of said transistors into conduction by application to the bases thereof of a first switching signal, and means for connecting said first and third transistors to means adapted to trigger said first and third transistors simultaneously with but for shorter duration than said fourth and second transistors respectively by application to the bases thereof of pulses.

3. The impedance matching circuit of claim 2 wherein said means adapted to trigger said second and fourth transistors comprises a free-running multivibrator providing a square-wave signal and said means to trigger said first and third transistors comprises a capacitive timing circuit adapted to pulse said first and third transistors in synchronization with the leading edges of said square wave signal.

* * * * *